United States Patent [19]

Campbell

[11] 4,265,021
[45] May 5, 1981

[54] DISTANCE MEASURING INSTRUMENT

[76] Inventor: Robert A. Campbell, 167 N. Ridgeland Ave., Oak Park, Ill. 60302

[21] Appl. No.: 54,247

[22] Filed: Jul. 2, 1979

[51] Int. Cl.$^3$ .............................................. G01B 3/20
[52] U.S. Cl. ................. 33/143 R; 33/143 M
[58] Field of Search ............ 33/143 R, 143 C, 143 M, 33/143 J, 143 K, 143 L, 147 R, 147 F, 147 T, 147 J, 147 K, 147 N, 158, 164 C

[56] References Cited

U.S. PATENT DOCUMENTS

| 563,089 | 6/1896 | Strange | 33/143 M |
|---|---|---|---|
| 874,197 | 12/1907 | Heym | 33/164 D |
| 1,238,045 | 8/1917 | Nelson | 33/143 M |
| 1,356,214 | 10/1920 | Metzger | 33/147 F |
| 1,414,847 | 5/1922 | Wells | 33/143 F |
| 3,142,121 | 7/1964 | Stefanov | 33/143 L |
| 3,190,006 | 6/1965 | Madeira | 33/143 M |
| 3,231,978 | 2/1966 | Sanders | 33/143 M |
| 4,008,523 | 2/1977 | von Voros | 33/147 N |

FOREIGN PATENT DOCUMENTS

| 610183 | 10/1960 | Italy | 33/143 M |
|---|---|---|---|
| 154861 | 5/1932 | Switzerland | 33/143 M |

Primary Examiner—Richard R. Stearns
Attorney, Agent, or Firm—Donald A. Kettlestrings

[57] ABSTRACT

A distance measuring instrument having a pair of identical, substantially planar, juxtaposed measuring members wherein each measuring member includes an elongated base and a distance measuring scale or indicator located on the base. An arm projects from an end of each base, and each arm defines a first measuring surface for making "outside" measurements and a second measuring surface for making "inside" measurements. A spring or other elastic member is attached to and extends between each arm for urging the first measuring surfaces toward each other. A handle may also project from the base of each measuring member for enabling the user to operate the instrument with one hand, leaving the other hand free to hold the object being measured.

22 Claims, 28 Drawing Figures

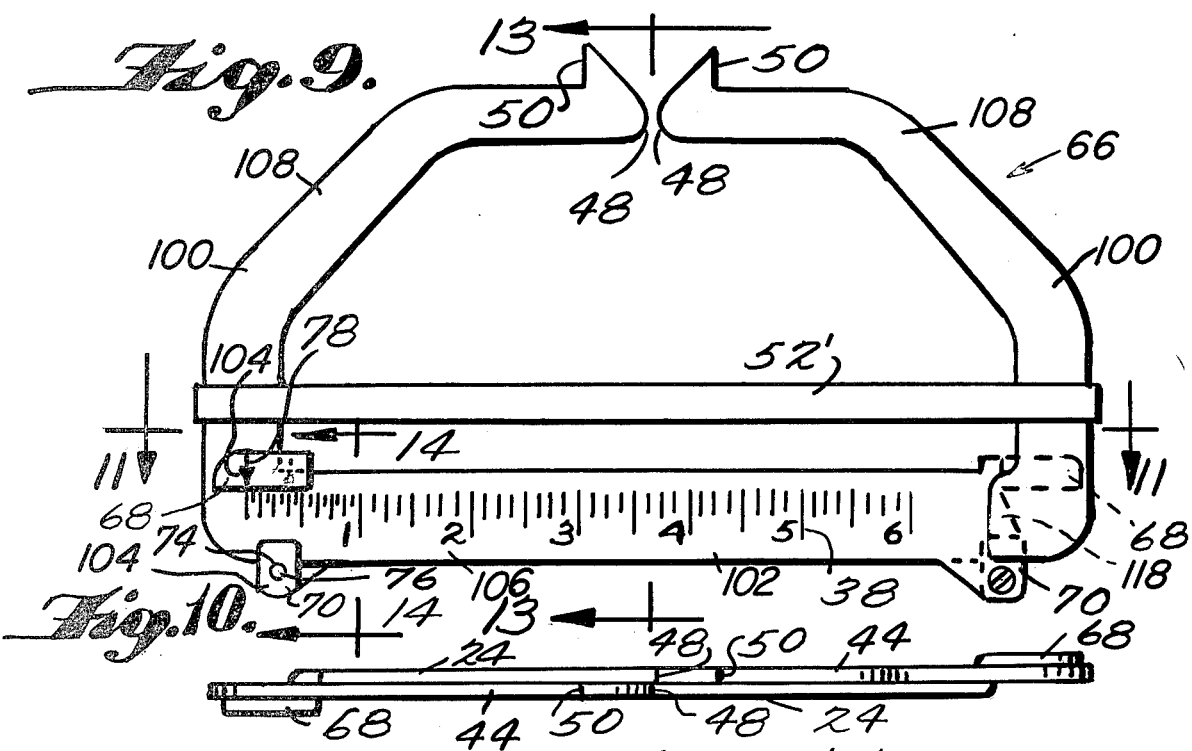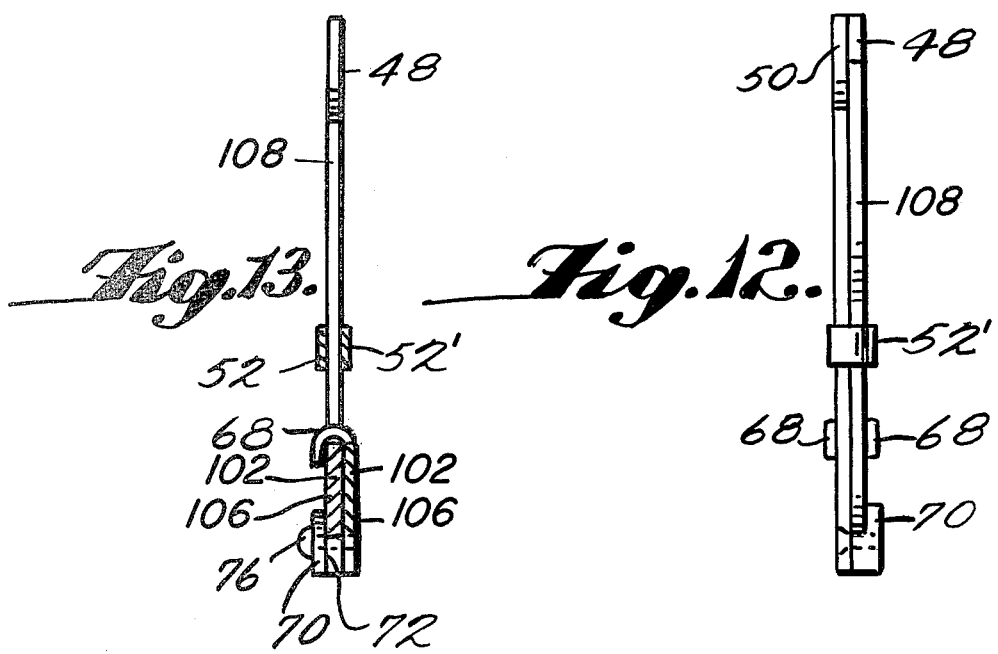

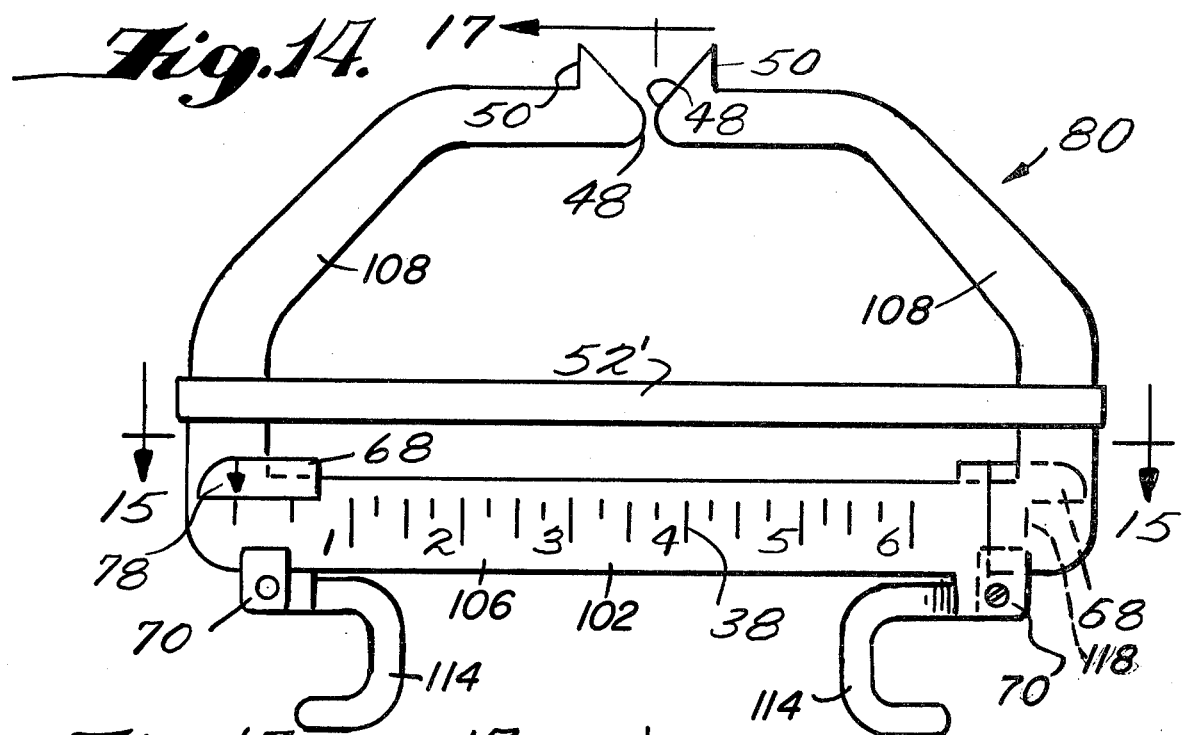
Fig.14.
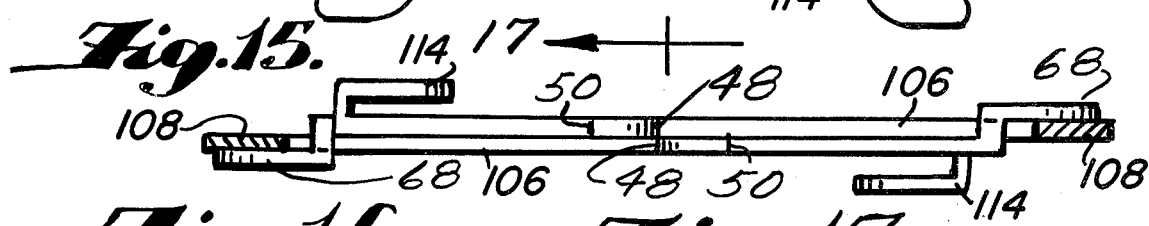
Fig.15.
Fig.16.  Fig.17.
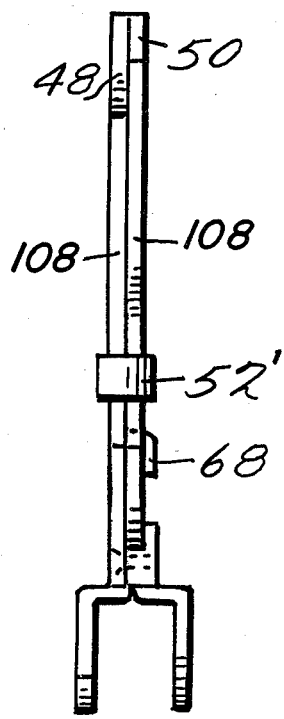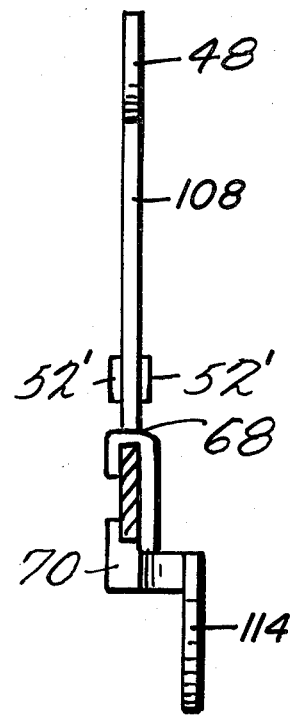

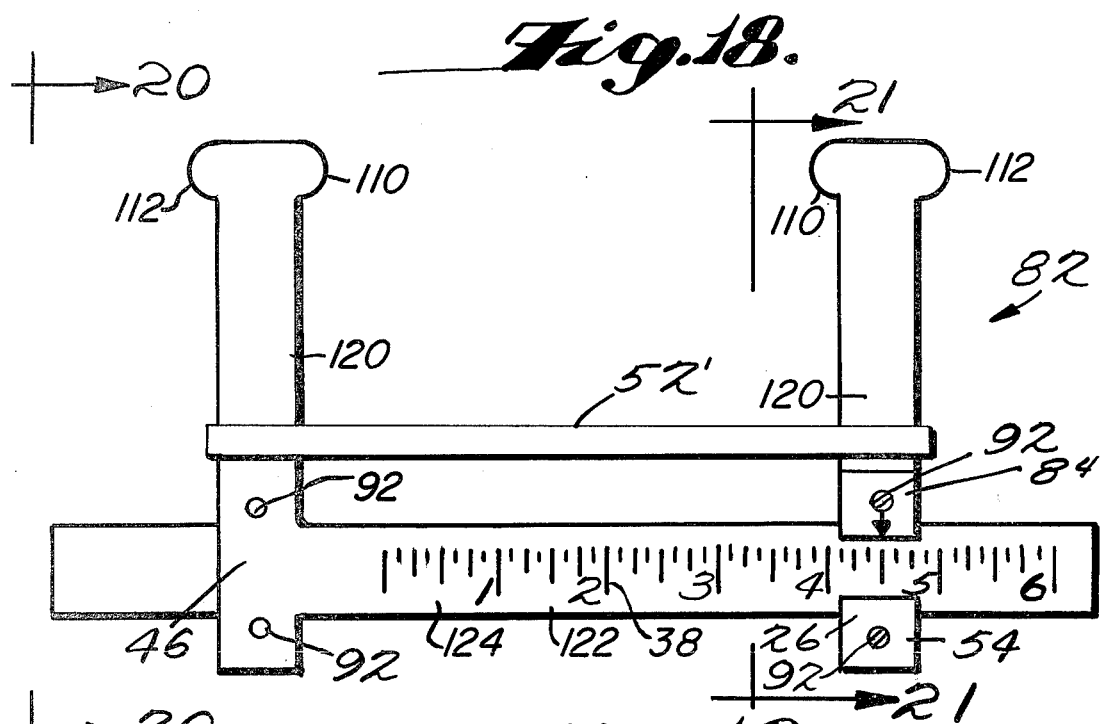
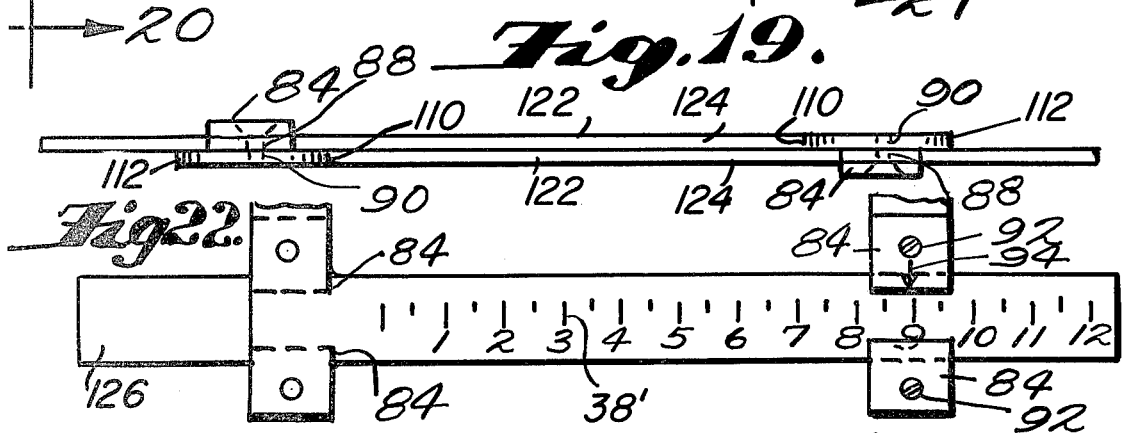
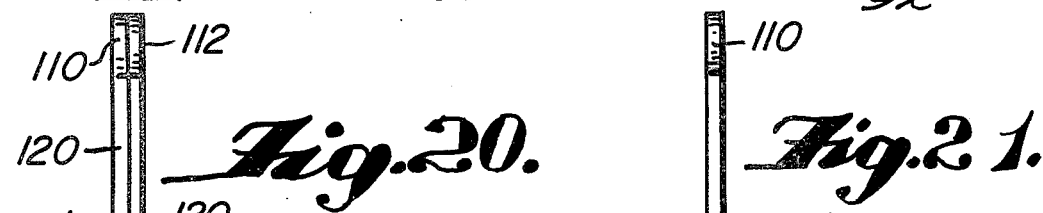
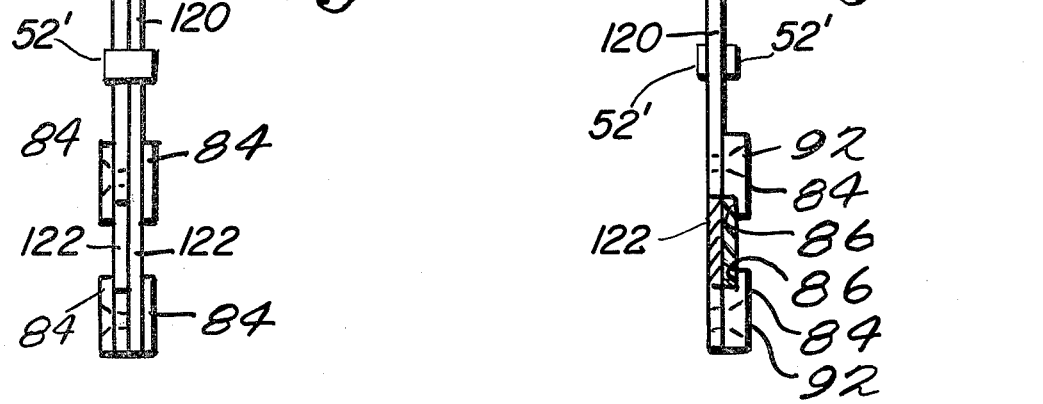

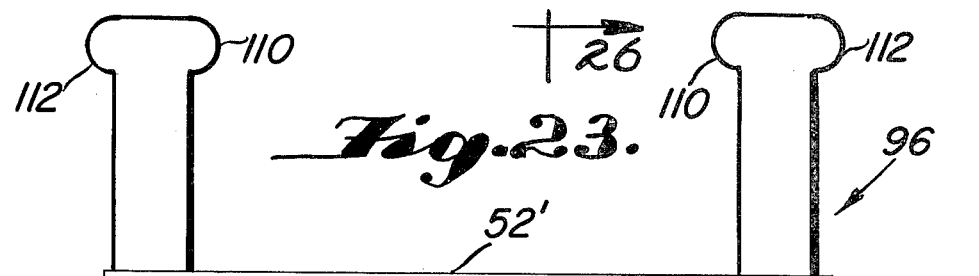
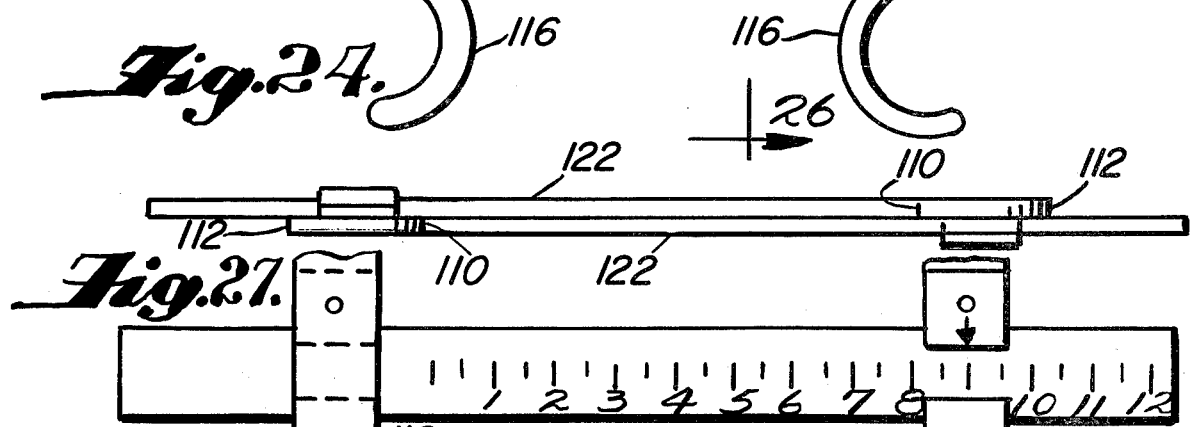
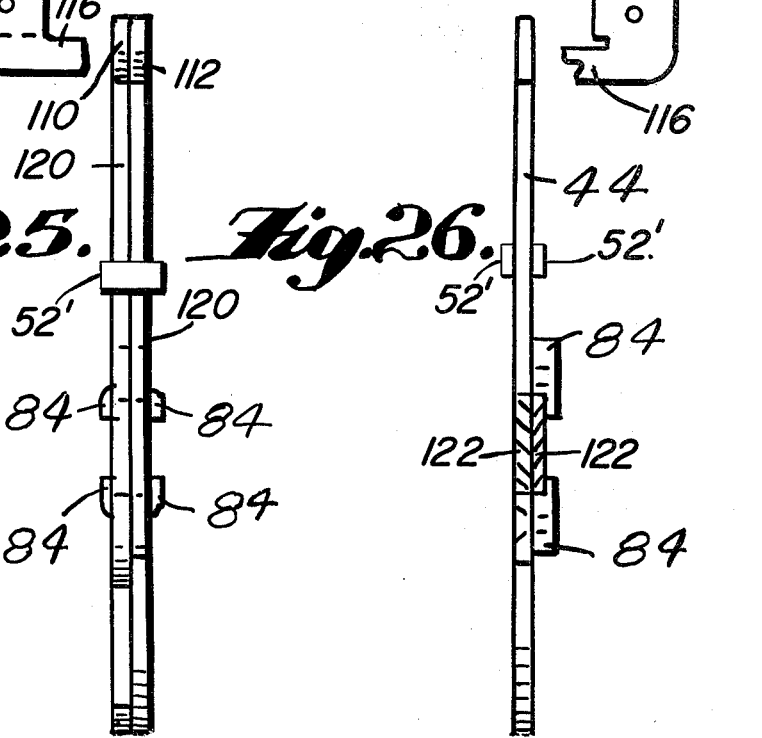

DISTANCE MEASURING INSTRUMENT

This invention relates to distance measuring instruments and more particularly to a direct reading sliding caliper capable of making "inside" and "outside" precision distance measurements in both English and metric units.

Numerous types of distance measuring instruments have been developed over the years. For example, the long leg caliper having two identical arc legs is presently in common usage. The legs of the caliper pivot in an arc about a common pin fastener, and the distance is read with a ruler. The Vernier caliper is also in common usage. This caliper is provided with etched scales on a main L-shaped frame and the distance is read with a moving slider part. This is a very expensive tool and is not compatible for large measurements of big objects.

It is, therefore, an object of the present invention to provide a distance measuring instrument or caliper that is capable of providing direct measurement readings without the use of a separate ruler or scale.

Another object is to provide a distance measuring instrument that can make "inside" and "outside" precision measurements.

A further object of the invention is the provision of a distance measuring instrument or caliper which provides a direct reading of distance in both English and metric units of measurement.

Still another object is to provide a distance measuring instrument that is relatively inexpensive to manufacture and easy to operate.

Yet another object of the present invention is the provision of a distance measuring instrument or caliper which can be operated with one hand to provide direct distance readings.

A still further object of the invention is to provide a distance measuring instrument or caliper designed to readily circumvent obstructions for easy measuring of objects.

Another object is to provide a distance measuring instrument or caliper which can be locked into position for any desired measurement.

A further object is to provide a distance measuring instrument or caliper which can be used to accurately measure dimensions of large objects.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a distance measuring instrument having a pair of substantially planar and substantially identical juxtaposed measuring members, each of the members having an elongated base. Means are provided in operative relationship with the base of each of the measuring members for cooperating with the base of the other measuring member to hold the bases in juxtaposed and slideable relationship with each other. An arm projects from a first end of each of the bases, and each arm defines a first measuring surface and a second measuring surface. First means for displaying distance measurements are located on a first side of the base of a first one of the measuring members, and means are provided in operative relationship with the measuring members for urging the first measuring surfaces toward each other.

In accordance with the invention, the instrument may be provided with a handle projecting from the base of each of the measuring members wherein each of the handles projects from each of the respective bases at a location adjacent to a second end of each of the bases and wherein each handle projects from each base in a substantially opposite direction from the arm.

It is to be understood that both the foregoing general description and the following detailed description are exemplary and explanatory, but are not restrictive of the invention.

The accompanying drawings, which are incorporated in and constitute a part of this specification, illustrate examples of preferred embodiments of the invention and, together with the description, serve to explain the principles of the invention.

FIG. 2 is a top plan view of the first embodiment;

FIG. 9 is a front elevation view of a third invention embodiment;

FIG. 10 is a top plan view of the third embodiment;

FIG. 11 is a section view of the third embodiment taken along the line 11—11 of FIG. 9 and looking in the direction of the arrows;

FIG. 12 is an end elevation view of the third embodiment;

FIG. 13 is a section view of the third embodiment taken along the line 13—13 in FIG. 9 and looking in the direction of the arrows;

FIG. 14 is a front elevation view of a fourth embodiment;

FIG. 15 is a section view of the fourth embodiment taken along the line 15—15 in FIG. 14 and looking in the direction of the arrows;

FIG. 16 is an end elevation view of the fourth embodiment;

FIG. 17 is a section view of the fourth embodiment taken along the line 17—17 in FIG. 14 and looking in the direction of the arrows;

FIG. 18 is a front elevation view of a fifth embodiment of the invention;

FIG. 19 is a top plan view of the fifth embodiment;

FIG. 20 is an end elevation view of the fifth embodiment;

FIG. 21 is a section view of the fifth embodiment taken along the line 21—21 in FIG. 18 and looking in the direction of the arrows;

FIG. 22 is a fragmentary rear elevation view of the fifth embodiment showing a metric distance scale;

FIG. 23 is a front elevation view of a sixth invention embodiment;

FIG. 24 is a top plan view of the sixth embodiment;

FIG. 25 is an end elevation view of the sixth embodiment;

FIG. 26 is a section view taken along the line 26—26 in FIG. 23 and looking in the direction of the arrows;

FIG. 27 is a fragmentary rear elevation view of the sixth embodiment showing a metric distance scale.

Figure 1:
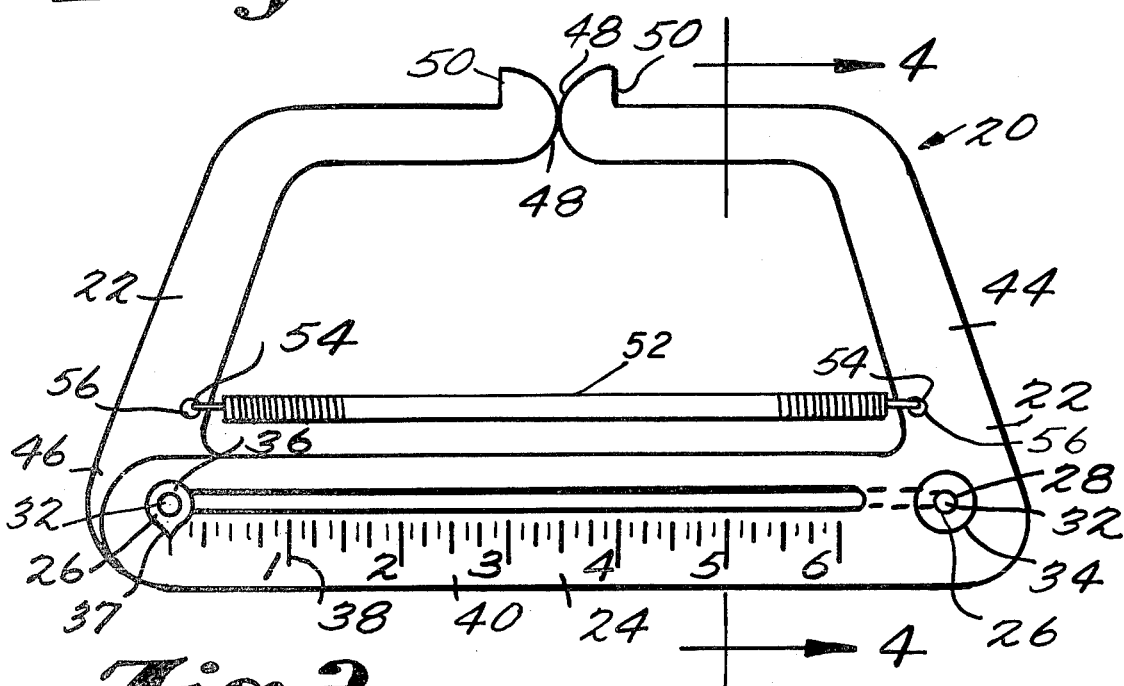
FIG. 1 is a front elevation view of a first embodiment of the invention.
Figures 3, 4:
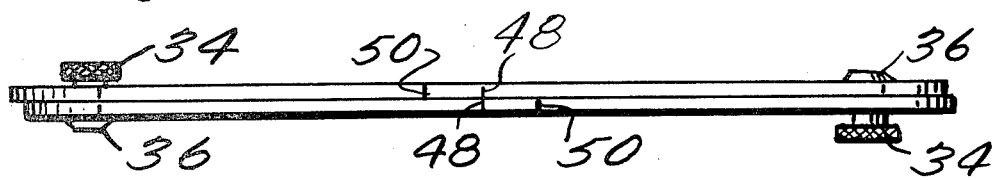
FIG. 3 is an end elevation view of the first embodiment.
FIG. 4 is a section view of the first embodiment taken along the line 4—4 of FIG. 1 and looking in the direction of the arrows.
Figure 28:
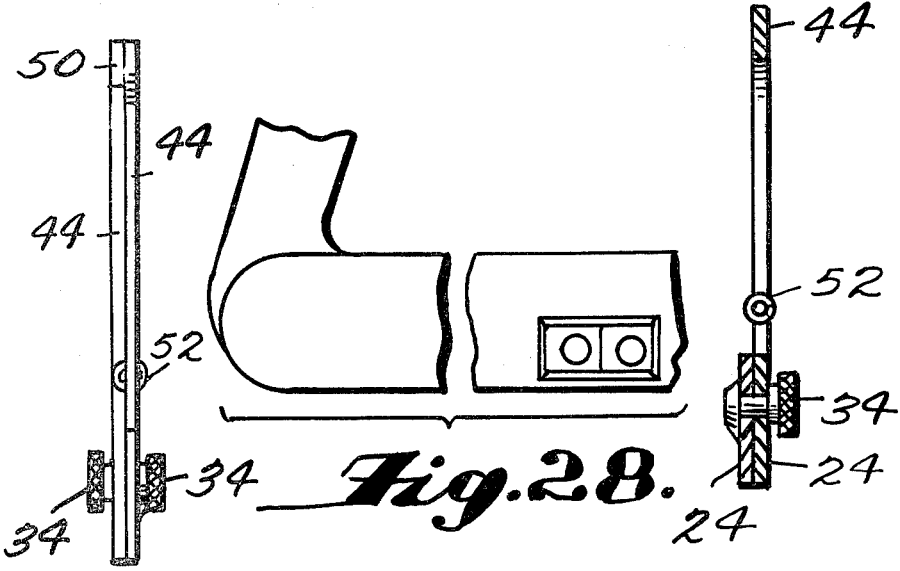
FIG. 28 is a fragmentary front elevation view representing each of the invention embodiments having an electronic readout.

With reference now to the drawings, wherein like reference characters designate like or corresponding parts throughout the several views, there is shown in FIGS. 1-4 a first embodiment 20 of a distance measuring instrument in accordance with this invention. Instrument 20 includes a pair of substantially planar and substantially identical juxtaposed and interacting measuring members 22, each defining an elongated base 24. Means 26 are provided in operative relationship with each base 24 for cooperating with the base of the other measuring member to hold the bases in juxtaposed and slideable relationship with each other.

More specifically, cooperating means 26 in first embodiment 20 of the instrument each includes a first aperture 28 and a second elongated aperture 30 defined within each base 24. Each cooperating means 26 of instrument 20 further includes first fasteners or bolts 32. One of the fasteners is positioned within aperture 28 of a first one of members 22 and within aperture 30 of a first one of members 22. Similarily, another fastener 32 is positioned within aperture 28 of a second member 22 and within aperture 30 of a first one of members 22.

Bolts 32, extending through apertures 28, 30 are held in position by nuts 34, and each of the nuts is preferably knurled to facilitate tightening and loosening of the nut by hand. Each of the bolts also preferably includes a bolt head 36 which is shaped and/or marked to define an index 37 for use in cooperation with a measuring scale 38 located on base 24.

Each of measuring members 22 preferably includes means for displaying distance measurements, and the distance measuring display means includes measuring scales 38 and bolt heads or indices 36, 37. The measuring scales are located on first sides 40 of each of bases 24 and one of measuring scales 38 is preferably divided into inches and fractions thereof while the other measuring scale is preferably divided into metric units of distance measurement. Alternatively, an electronic digital display 42 can be used in place of measuring scales 38 for directly displaying distance measurements. LED (light emitting diode) electronic digital displays and LCD (liquid crystal displays), as examples, could be used. Either of these electronic displays could be used with a pre-programmed "chip" component (not shown) activated by a magnetic strip (not shown) on base 24 of one or both members 22. One example of such an electronic display for use with a micrometer is described in Stefanov patent number 3,142,121 and the disclosure of the Stefanov patent is incorporated herein by reference.

Each member 22 also includes a C-shaped arm 44 projecting from a first end 46 of each base 24 and defining a first measuring surface 48 for enabling the instrument to make "outside" measurements, and further defining a second measuring surface 50 for determining "inside" measurements. A spring or other elastic means 52 are provided in operative relationship with members 22 for urging measuring surfaces 48 toward each other. More specifically, apertures 54 may be provided within each arm 44, and ends 56 of spring 52 are positioned within apertures 44 so that the spring acts under tension to normally urge surfaces 48 toward each other.

In operation of instrument 20 of this invention, substantially identical measuring members 22 are positioned with bases 24 in juxtapositioned and slideable relationship to each other. Knurled nuts 34 are loosened and members 22 are moved to accommodate the object being measured between measuring surfaces 48. Bolt 32 of each member 22 slides within elongated aperture 30 of the other member 22 until measuring surfaces 48 are in contacting position with respect to the object to be measured. The "outside" dimension of the measured object can then be read directly from measuring scales 38, either in English or metric units, and nuts 34 can be tightened onto bolts 32 to hold measuring members 22 in fixed position at any desired measurement. Tightening nuts 34 to hold the instrument in a fixed position is often helpful when measuring a number of objects of the same or similar dimensions so that the instrument can be used to determine if the measurements of the objects are identical. This is often referred to as a "go-no-go" gauge, and such measurements are frequently performed on metal castings when the same dimension is being repeatedly measured to determine the uniformity of the casting.

Another feature of this embodiment of the invention enables one or both of lock nuts 34 to be removed from its bolt and the bolt can then be removed from its apertures 28, 30. The instrument can then be folded over so that measuring members 22 are placed in congruent relationship to each other to occupy a smaller space in the pocket or tool box for storage.

Measuring surfaces 50 are used for determining "inside" measurements of objects. Operation of the instrument is the same as previously described except that surfaces 50 are caused to contact the object to be measured. If the distance between measuring surface 48 and surface 50 on each arm 44 is one-half inch, for example, "inside" measurements from one inch and greater can be made and can be read directly from the measuring scales 38 by the operator by mentally substracting one inch from the scale reading. Alternatively, an additional "inside" measuring scale (not shown) could be positioned along each base 24 for the purpose of enabling the operator to directly read all "inside" measurements.

Figure 5:
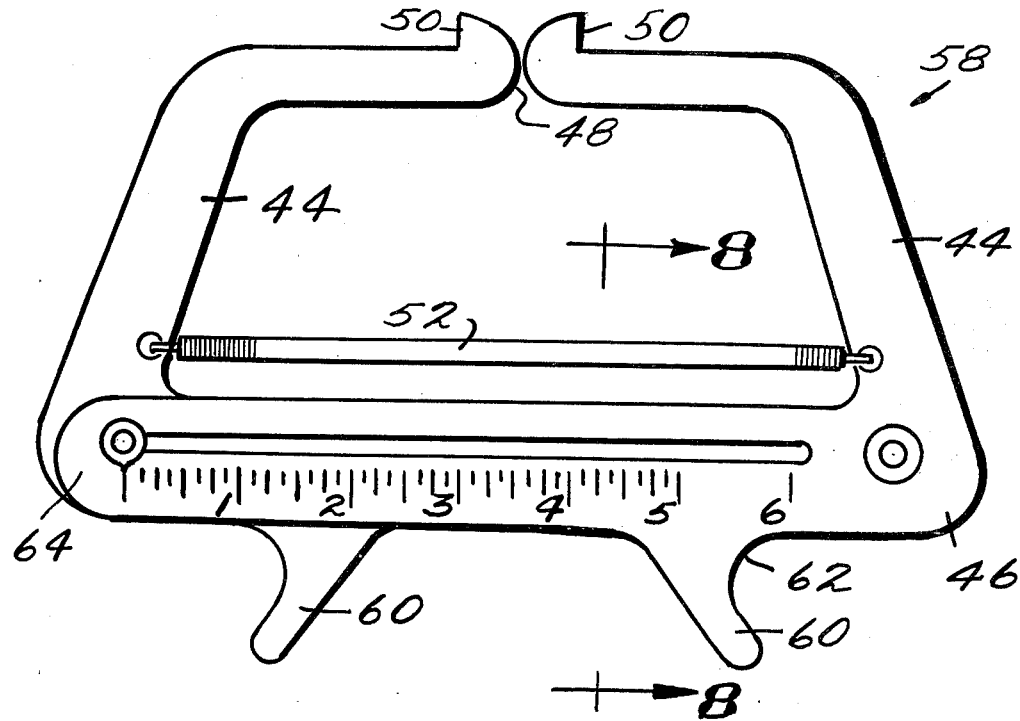
FIG. 5 is a front elevation view of a second invention embodiment.
Figure 6:
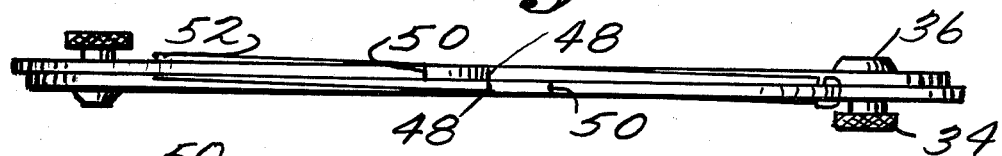
FIG. 6 is a top plan view of the second embodiment.
Figures 7, 8:
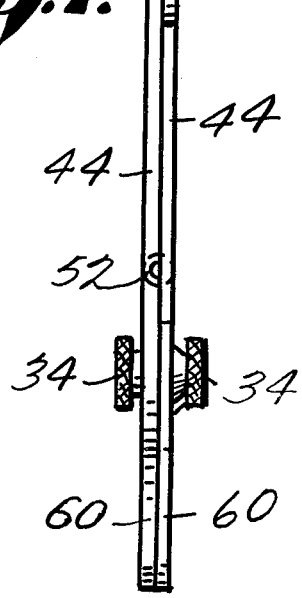
FIG. 7 is a side elevation view of the second embodiment.
FIG. 8 is a fragmentary section view of the second embodiment taken along the line 8—8 of FIG. 5 and looking in the direction of the arrows.

A second embodiment 58 of an instrument in accordance with this invention is illustrated in FIGS. 5-8. This embodiment of the invention is similar to first embodiment 20 and further includes a handle 60 projecting from base 24 of each of measuring members 22. Each handle preferable projects from each base 24 at a location 62 adjacent to a second end 64 of each of the bases, and each handle projects from the base in a substantially opposite direction from arm 44.

Handles 60 are an important feature of this invention and provide for the important advantage of enabling the user to hold and operate the instrument with one hand. This allows the user to use his other hand to hold the object being measured, and this is an important advantage over previously known calipers which have required two hands to hold and to operate.

In operation of instrument 58 of this invention, nuts 34 are first loosened on bolts 32 and the object to be measured is held in one hand by the user. With the other hand, the user grasps handles 60 with the base of his thumb on one handle and the crook of his third finger on the other handle. By squeezing his hand, members 22 of instrument 58 are slideably moved relative to one another so that "outside" measuring surfaces 48 are moved apart to accommodate the object being measured. After the object to be measured has been placed between measuring surfaces 48, the user can relax his grasp on handles 60 to allow spring 52 to move members 22 together so that measuring surfaces 48 contact the object to be measured. Bolt heads and/or indices 36, 37, cooperating with measuring scales 38, will then directly indicate the "outside" dimension of the object being measured. Thus, squeezing with the fingers expands and opens instrument 58 while the action of spring 52 closes the instrument. Although handles 60 are illustrated as projecting from positions adjacent to second ends 64 of bases 24, it should be understood that the handles could also project from positions adjacent to first ends 46 of the bases.

Operation of the instrument to determine "inside" measurements of an object is similar to that described for determining "outside" measurements except that the "inside" measuring surfaces 50 are first positioned within the "inside" dimensions to be measured. Handles 60 are then squeezed by the user to cause surfaces 50 to separate farther apart until surfaces 60 contact the surfaces of the object being measured. The "inside" dimension can then be read from scale 38 or from a direct reading "inside" measurement scale (not shown) on base 24.

As in the previously described embodiment, instrument 58 may also include an electronic display 42.

A third embodiment 66 of this invention is illustrated in FIGS. 9-13 wherein cooperating means 104 include a first flange 68 and a second flange 70 projecting from a second end 118 of each base 102 and positioned for engaging, retaining and guiding the base of the other measuring member 100. Each cooperating means 104 further defines a first flange aperture 72 adjacent to second end 118 of each base 102 and a second flange aperture 74 within each of second flanges 70. A bolt or other flange fastener 76 extends through apertures 72, 74 and holds each of flanges 70 in position on each base 102. A mark or index 78 is located on flange 68 of each of measuring members 100 for cooperating with the measuring scale located on the other of measuring members 100 whereby the distance between measuring surfaces 48 is directly displayed. As in the preceding embodiments, this embodiment provides for an English distance measuring scale in inches and fractions thereof on a first side 106 of the base of one of measuring members 100 and a metric distance measuring scale on a first side 106 of the base of the other measuring member. A spring, rubber band or other elastic member 52' is located between C-shaped arms 108, and as in the preceding embodiments, is provided for the purpose of urging measuring surfaces 48 toward each other.

Flanges 68, 70 are preferably bendable or slightly flexible to retain and guide bases 102 to enable the measuring members to be separated. The separated measuring members can then be placed side by side and in substantially congruent relationship to occupy a smaller space in the pocket or tool box for storage.

Another embodiment 80 of this invention is illustrated in FIGS. 14-17. This embodiment is the same as instrument 66, previously described with the addition of handle 114 projecting from bases 102 at locations adjacent ends 118. The operation of instrument 80 is the same as that previously described with respect to instrument 58. The operator is able to hold and to operate the instrument with one hand while holding the object to be measured in his other hand. As in all of the preceding embodiments, instrument 80 may also use an electronic display 42.

Another embodiment 82 of the invention is illustrated in FIGS. 18-22 wherein cooperating means 26 include a pair of lugs 84 attached to each of arms 120 and in positions to receive and hold base 122 of the other L-shaped measuring member in slideable relationship with channels 86 of each lug. Each lug 84 defines an aperture 88, and each arm 120 of instrument 82 defines apertures 90. A bolt and nut or other fastening member 92 removably attaches the lugs to each arm 120 so that the base of the other measuring member is positioned within channels 86 and in slideable relationship therewith. An index or mark 94 is located on at least one lug of each pair of lugs and in cooperating relationship with measuring scales 38, 38' for indicating the distance between "outside" measuring surfaces 110. An additional measuring scale (not shown) could also be located on each base 122 of instrument 82 for the purpose of providing direct readings of distances between "inside" measuring surfaces 112. Thus, direct readings for "inside" and "outside" measurements could be obtained. This embodiment of the invention is particularly useful for obtaining accurate measurements of larger objects.

As in each of the previous embodiments, measuring scales 38, 38' are positioned on a first side 124 of bases 122 to provide distance measurements in English units on one side and to provide distance measurements in metric units on the other side. A spring or other elastic member 52' is also connected between arms 120 for the purpose of mormally urging measuring surfaces 110 toward each other.

Another embodiment 96 of this invention is illustrated in FIGS. 23-27. Instrument 96 is identical with instrument 82, previously described, with the addition of handles 116 projecting from bases 122. Each handle 116 preferably projects from each base at a location adjacent to a second end 126 of the base, and each handle projects from the base in a substantially opposite direction from arm 120. As in all of the preceding embodiments, an electronic display 42 may be used in place of measuring scales 38.

This invention provides for a precision measuring instrument that can provide direct readings for "inside" and for "outside" measurements and wherein the measurements can be read on both English and metric scales. The instruments of this invention are inexpensive to manufacture and easy to operate, and several of the embodiments of this invention provide the additional advantage of enabling the operator to hold and to operate the instrument with one hand. Each of the embodiments described can be made to different dimensions to accommodate measurements of objects of different sizes, and the instruments can be made from metal, plastic or other suitable materials.

The invention in its broader aspects is not limited to the specific details shown and described, and departures may be made from such details without departing from the principles of the invention and without sacrificing its chief advantages.

What is claimed is:
1. A distance measuring instrument comprising:
a pair of substantially planar and substantially identical juxtaposed measuring members, each of said members having an elongated base;
means in operative relationship with the base of each of said measuring members for cooperation with said base of said other measuring member to hold said bases in juxtaposed and slideable relationship with each other;

an arm projecting from a first end of each of said bases, each said arm definining a first measuring surface and further defining a second measuring surface;

first means for displaying distance measurements located on a first side of said base of a first one of said measuring members;

means in operative relationship with said measuring members for urging said first measuring surfaces toward each other;

each of said cooperating means including a first aperture and a second elongated aperture defined within each said base, a first fastener positioned within said first aperture of said first measuring member and within said second aperture of the second one of said measuring members, a second fastener positioned within said first aperture of said second measuring member and within said second aperture of said first measuring member, said fasteners holding said measuring members with said first measuring surfaces in opposed relationship with each other;

a first index in operative relationship with said second fastener and with said first display means for indicating the distance between said first measuring surfaces;

a handle projecting from the base of each of said measuring members, each of said handles projecting from each of said respective bases at a location adjacent to a second end of each of said bases, and each of said handles projecting from said bases in a substantially opposite direction from said arms; and wherein each of said measuring members is substantially C-shaped in configuration.

2. An instrument as in claim 1 wherein said urging means include an elastic member connected to and extending between said arms.

3. A distance measuring instrument comprising:

a pair of substantially planar and substantially identical juxtaposed measuring members, each of said members having an elongated base;

means in operative relationship with the base of each of said measuring members for cooperating with said base of said other measuring member to hold said bases in juxtaposed and slideable relationship with each other;

an arm projecting from a first end of each of said bases, each said arm defining a first measuring surface and further defining a second measuring surface;

first means for displaying distance measurements located on a first side of said base of a first one of said measuring members;

means in operative relationship with said measuring members for urging said first measuring surfaces toward each other;

each of said cooperating means including first and second flanges projecting from a second end of each said base and positioned for engaging, retaining and guiding said other base; and wherein each of said cooperating means further defines a first flange aperture adjacent said second end of each said base and a second flange aperture within each of said second flanges, a flange fastener extending through said flange apertures and holding each of said second flanges in position on each of said bases.

4. An instrument as in claim 3 further including a first index in operative relationship with said first flange of a second one of said measuring members and with said first display means for indicating the distance between said first measuring surfaces.

5. An instrument as in claim 4 wherein said first distance display means include a measuring scale divided into inches and fractions thereof and wherein said instrument further includes second means for displaying distance measurements located on a first side of said base of a second one of said measuring members and including a distance measuring scale divided into metric units of measurement.

6. An instrument as in claim 5 further including a second index in operative relationship with said first flange of said first measuring member and with said second display means for indicating the distance between said first measuring surfaces.

7. An instrument as in claim 6 further including a handle projecting from the base of each of said measuring members.

8. An instrument as in claim 7 wherein each of said handles projects from each of said respective bases at a location adjacent to said second end of each of said bases.

9. An instrument as in claim 8 wherein said handles project from said bases in a substantially opposite direction from said arms.

10. An instrument as in claim 9 wherein each of said measuring members is substantially C-shaped in configuration.

11. An instrument as in claim 9 wherein said urging means include an elastic member connected to and extending between said arms.

12. A distance measuring instrument comprising:

a pair of substantially planar and substantially identical juxtaposed measuring members, each of said members having an elongated base;

means in operative relationship with the base of each of said measuring members for cooperating with said base of said other measuring member to hold said bases in juxtaposed and slideable relationship with each other;

an arm projecting from a first end of each of said bases, each said arm defining a first measuring surface and further defining a second measuring surface;

first means for displaying distance measurements located on a first side of said base of a first one of said measuring members;

means in operative relationship with said measuring members for urging said first measuring surfaces toward each other;

said cooperating means including two pairs of lugs, each lug defining a recessed channel, and one pair of said lugs attached to each of said arms in position to receive and hold said other base in slideable relationship with said channels.

13. An instrument as in claim 12 wherein said lugs are removably attached to said arms.

14. An instrument as in claim 13 further including an index in operative relationship with one of said lugs attached to a second one of said measuring members and with said first display means for indicating the distance between said first measuring surfaces.

15. An instrument as in claim 14 wherein said first distance display means include a measuring scale divided into inches and fractions thereof and wherein said instrument further includes second means for displaying distance measurements located on a first side of said base of a second one of said measuring members and including a distance measuring scale divided into metric units of measurement.

16. An instrument as in claim 15 further including a second index in operative relationship with one of said lugs attached to said first measuring member and with said second display means for indicating the distance between said first measuring surfaces.

17. An instrument as in claim 16 further including a handle projecting from the base of each of said measuring members.

18. An instrument as in claim 17 wherein each of said handles projects from each of said respective bases at a location adjacent to a second end of each of said bases.

19. An instrument as in claim 18 wherein said handles project from said bases in a substantially opposite direction from said arms.

20. An instrument as in claim 19 wherein said urging means include an elastic member connected to and extending between said arms.

21. An instrument as in claim 12 wherein said first distance display means include an electronic digital display.

22. An instrument as in claim 21 wherein each of said measuring members is substantially L-shaped in configuration.

* * * * *